Patented July 21, 1936

2,048,172

UNITED STATES PATENT OFFICE 2,048,172

METHOD OF PRODUCING PURE ETHERS OF DINITROPHENOL

Laurence G. Wesson, Baltimore, Md., assignor to Veader Leonard, Baltimore, Md.

No Drawing. Application August 17, 1935, Serial No. 36,747

5 Claims. (Cl. 260—143)

This invention relates to the ethers of 2,4 dinitrophenol, and more particularly to an improved method of purifying these ethers so as to render them suitable for therapeutic use.

Willgerodt (Berichte der Deutschen Chemishen Gesellschaft, vol. 12, p. 762, (1879)) describes a method of producing a number of ethers of 2,4 dinitrophenol, based on the reaction of the corresponding alcohol with 2,4 dinitrochlorbenzene, under the influence of potassium hydroxide.

This reaction takes place according to the general equation:—

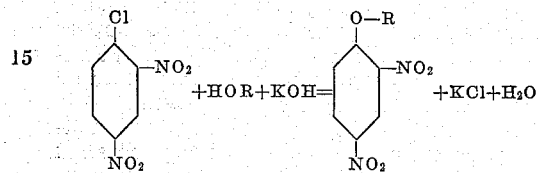

where R is any desired alkyl group or other hydrocarbon radical.

The procedure of Willgerodt was to dissolve dinitrochlorbenzene in the alcohol, and then add the theoretical amount of KOH dissolved in the same alcohol. The excess of alcohol was then distilled off, water was added to the residue, and the oil that separated out was considered by Willgerodt to contain the desired ether. In some cases, crystals were formed, and these were recrystallized from alcohol for the purpose of purification.

Willgerodt specifically mentions the preparation of methyl, ethyl, allyl, iso-amyl, and other ethers, and showed that the method is a general one, probably applicable to the formation of any of the ethers of dinitrophenol where the corresponding alcohols are known, and are available.

Wilhelmy (Receuil de Travaux Chimique 21, (1902) p. 439) improved Willgerodt's specific procedure as applied to the production of the methyl ether by adding a concentrated (80 percent) aqueous solution of KOH in small successive portions to the methyl alcoholic solution of dinitrochlorbenzene. Wilhelmy also modified Willgerodt's process by using an excess of KOH. After adding the KOH, he then cooled and neutralized the solution, filtered the resulting crystals, washed out the associated KCl with water, and recrystallized the ether from alcohol.

If the procedure of Willgerodt and/or the modification of Wilhelmy is followed, the product that is obtained is not even substantially pure. It contains certain nonvolatile constituents, as well as some dinitrophenol itself, which is formed during the reaction and which cannot be separated from the ether by distillation or crystallization. But even worse, it contains small amounts of unreacted dinitrochlorbenzene which likewise cannot be removed by fractional distillation, by repeated recrystallizations or by any other method suggested by prior investigators. The two above mentioned impurities cling tenaciously to the ethers throughout these purification procedures.

As set forth in my prior copending applications Serial No. 7,460, filed February 20, 1935 and Serial No. 17,723 filed April 22, 1935, I have found that the alkyl ethers of 2,4 dinitrophenol constitute valuable pharmaceutical products useful in stimulating the metabolic rate in the animal organism, and it is therefore of the utmost importance to produce these ethers in a substantially pure state uncontaminated by dangerous or objectionable substances.

Dinitrophenol is, of course, undesirable in the final product because of its powerful toxic effects and it is imperative that the use of these ethers be freed from the uncertainty of action which would be caused by the presence of any of this material.

Dinitrochlorbenzene is an extremely irritating substance to the skin, the tongue and mucous membranes. I have found that even a solution of a repeatedly recrystallized ether made by the Willgerodt and Wilhelmy process, causes reddening and blistering of the hands because of its content of dinitrochlorbenzene. For the same reason, these impure ethers produce an intolerable burning biting taste when orally administered, and this is true even though the unreacted dinitrochlorbenzene is present only in minute quantities. It is therefore essential that, for therapeutic purposes, all traces of dinitrochlorbenzene be eliminated from these ethers.

It is therefore the object of the present invention to devise means by which ethers of dinitrophenol produced in accordance with the Willgerodt and Wilhelmy process may be absolutely and completely freed from the above discussed highly objectionable impurities and made therapeutically available as pure and reliable pharmaceutical products, the action of which can be forecast with certainty.

Accordingly, after long experimentation, I have devised an improved method of producing these ethers in a pure state. This method comprises first the removal of all free dinitrophenol present by repeatedly treating the impure ether with dilute alkali; and second, washing the crystallized ether in a solvent capable of completely dissolving out the unreacted dinitrochlorbenzene, but in which the dinitrophenol ether itself is substantially insoluble. I have found that many of the light or low-boiling aliphatic hydrocarbons or mixtures thereof such as petroleum ether, benzine, naphtha, commercial octane, gasoline and the like, constitute excellent solvents for this purpose.

The following specific example is given of the exact manner in which my improved method is preferably carried out, the production of the iso-propyl ether of 2,4 dinitrophenol being used by way of illustration:—

To 50 gm. of 2,4 dinitrochlorbenzene and 250 cc. of 99 percent iso-propyl alcohol in a flask provided with a reflux condenser is added 25 cc. of an 80 percent KOH solution, drop by drop, while the solution is kept at the boiling temperature and agitated with a stirring device. After the alkali has been added, the solution is heated and stirred for one-half an hour, after which the excess KOH is neutralized with HCl and the iso-propyl alcohol is distilled off leaving an impure residue of KCl and iso-propyl ether. From these mixed crystals, the iso-propyl ether of dinitrophenol is extracted with ordinary ether. After extracting the free dinitrophenol present as an impurity in the iso-propyl ether from the ether solution by means of repeated treatment with very dilute NaOH solution, the ether solution is washed with very dilute HCl, and then with water. The solvent is evaporated and the residue submitted to fractional distillation in a high vacuum. The main fraction of this distillation boiling within a range of 2 or 3° C. (152–155° C. at 0.75 mm. pressure) is dissolved in ordinary ether and washed as before with dilute NaOH, HCl and water. The solvent ether is again removed by evaporation and distillation and the residue crystallized once from 95 percent ethyl alcohol. The crystalline product, which contains the iso-propyl ether sought, but contaminated with unreacted dinitrochlorbenzene, after air-drying to remove the alcohol, is pulverized, after which it is extracted with petroleum ether or the like until chlorine-free. The resulting purified product melts at 54–56° C., has only a barely perceptible yellow tinge and only the slightly bitter taste that seems to be characteristic of the ethers of dinitrophenol. It is completely devoid of any irritant action.

In a similar manner, other pure ethers of 2,4 dinitrophenol are produced from the corresponding alcohols.

Not only do I contemplate the purification, by by new process, of the normal and branched chain alkyl and unsaturated ethers, such as hereinabove mentioned, but also of the aralkyl ethers such as benzyl, and probably many more.

In fact, my improved method is thought to be applicable to the production, in a state of purity suitable for therapeutic use, of any ether of dinitrophenol which can be made by means of the fundamental reaction between an alcohol and dinitro-chlorbenzene, in the presence of a caustic alkali.

What I claim is:

1. In a process for the production, in a sufficiently pure state for therapeutic use, of ethers of 2,4 dinitrophenol, by the action of the corresponding alcohol on dinitrochlorbenzene, in the presence of a caustic alkali, the step which comprises removing all traces of the unreacted dinitrochlorbenzene from the product by extracting the same with a low boiling liquid hydrocarbon.

2. In a process for the production of substantially pure ethers of 2,4 dinitrophenol, by the action of the corresponding alcohol on dinitrochlorbenzene, in the presence of a caustic alkali, the steps which comprise removing all free 2,4 dinitrophenol present by treating the product with dilute alkali, and dissolving out all traces of the unreacted dinitrochlorbenzene by treating the product with a low boiling liquid aliphatic hydrocarbon.

3. In a process for the production of purified ethers of dinitrophenol by the action of the corresponding alcohol on dinitrochlorbenzene in the presence of the hydroxide of an alkali metal, the step which comprises treating the impure crystallized ether with a low boiling liquid petroleum hydrocarbon to dissolve out and remove all traces of unreacted dinitrochlorbenzene.

4. In a process for the production, in a sufficiently pure state for therapeutic use, of alkyl ethers of dinitrophenol by the action of the corresponding alcohol on dinitrochlorbenzene in the presence of the hydroxide of an alkali metal, the steps which comprise repeatedly treating the product with dilute alkali to remove any free dinitrophenol present, and then extracting the ether with a low boiling liquid petroleum hydrocarbon to dissolve out all traces of unreacted dinitrochlorbenzene.

5. The method of purifying ethers of dinitrophenol, said ethers resulting from the action of the corresponding alcohol on dinitrochlorbenzene in the presence of a caustic alkali, which method comprises treating the product with a low boiling liquid petroleum hydrocarbon solvent to remove all traces of the unreacted dinitrochlorbenzene.

LAURENCE G. WESSON.